US009222498B2

(12) United States Patent
Faucher et al.

(10) Patent No.: US 9,222,498 B2
(45) Date of Patent: Dec. 29, 2015

(54) LIFTING BAR AND LIFTING BAR CONNECTOR

(75) Inventors: Martin Faucher, Quebec (CA); Michel Corriveau, Quebec (CA); Denis-Alexandre Brulotte, Orford (CA)

(73) Assignee: ArjoHuntleigh Magog, Inc., Magog, Quebec (CA)

( * ) Notice: Subject to any disclaimer, the term of this patent is extended or adjusted under 35 U.S.C. 154(b) by 406 days.

(21) Appl. No.: 13/606,358

(22) Filed: Sep. 7, 2012

(65) Prior Publication Data

US 2013/0086793 A1 Apr. 11, 2013

Related U.S. Application Data

(60) Provisional application No. 61/532,300, filed on Sep. 8, 2011, provisional application No. 61/532,328, filed on Sep. 8, 2011.

(51) Int. Cl.
*F16B 19/00* (2006.01)
*A61G 7/10* (2006.01)

(52) U.S. Cl.
CPC .............. *F16B 19/00* (2013.01); *A61G 7/1061* (2013.01); *A61G 7/1069* (2013.01); *A61G 7/1015* (2013.01); *A61G 7/1042* (2013.01); *A61G 2203/78* (2013.01); *Y10T 29/49947* (2015.01); *Y10T 403/60* (2015.01); *Y10T 403/602* (2015.01); *Y10T 403/7075* (2015.01)

(58) Field of Classification Search
CPC . A61G 7/1046; A61G 7/1019; A61G 7/1049; A61G 7/1051; A61G 7/1053; A61G 2200/34
USPC ..................... 5/83.1, 81.1 R, 86.1, 87.1, 89.1
See application file for complete search history.

(56) References Cited

U.S. PATENT DOCUMENTS

| 5,809,591 | A | 9/1998 | Capaldi et al. |
|---|---|---|---|
| 6,085,368 | A | 7/2000 | Robert et al. |
| 6,575,100 | B2 | 6/2003 | Faucher et al. |
| 6,675,412 | B2 | 1/2004 | Faucher et al. |
| 7,237,491 | B2 | 7/2007 | Faucher et al. |
| D553,825 | S | 10/2007 | Shani et al. |
| 7,284,745 | B2 | 10/2007 | Keane et al. |
| D566,375 | S | 4/2008 | Shani et al. |
| D567,472 | S | 4/2008 | Shani et al. |

(Continued)

FOREIGN PATENT DOCUMENTS

| EP | 0 213 915 A2 | 3/1987 |
|---|---|---|
| WO | WO 03/078294 A1 | 9/2003 |

*Primary Examiner* — Peter M Cuomo
*Assistant Examiner* — Brittany Wilson
(74) *Attorney, Agent, or Firm* — Finnegan, Henderson, Farabow, Garrett & Dunner, L.L.P.

(57) ABSTRACT

A patient lift connector for attaching and detaching a patient lifting bar to a load supporting member in a patient lifting system is described. The connector includes a connector body including a connecting block configured to be fixedly attached to the patient lifting bar. The connector also includes a pin holder coupled to the load supporting member and configured to be inserted through the connector body and into the connecting block, and an attachment latch secured to the connector body and configured to move between an open position and a closed position within the connector body. When the attachment latch moves from the closed position to the open position, the pin holder is allowed to be inserted into the connecting block and thereby allow the lifting bar to be attached to the load supporting member.

20 Claims, 14 Drawing Sheets

(56) References Cited

U.S. PATENT DOCUMENTS

| | | |
|---|---|---|
| 7,350,247 B2 | 4/2008 | Bogh-Sorensen |
| 7,434,787 B2 | 10/2008 | Hjort |
| 7,506,589 B2 | 3/2009 | Hjort |
| 7,634,825 B2 | 12/2009 | Chepurny et al. |
| 8,272,084 B2 * | 9/2012 | Spidare et al. ............ 5/83.1 |
| 2008/0222859 A1 | 9/2008 | Chepurny et al. |
| 2010/0064432 A1 | 3/2010 | Duquette et al. |
| 2011/0000015 A1 | 1/2011 | Faucher et al. |

* cited by examiner

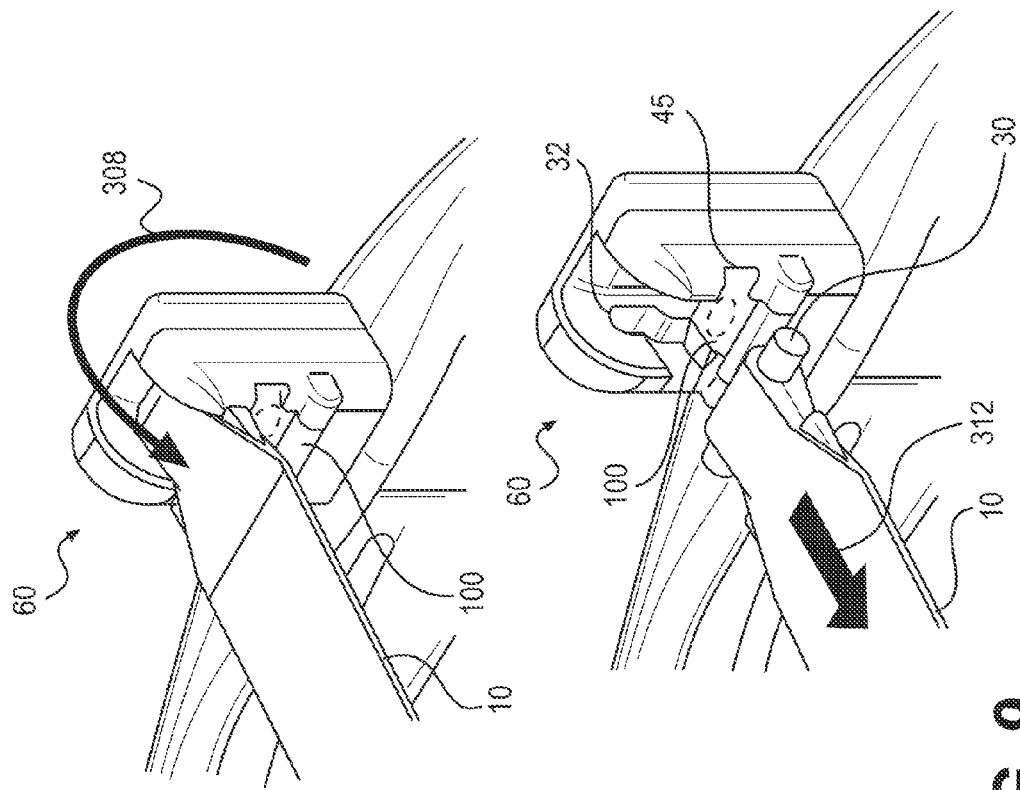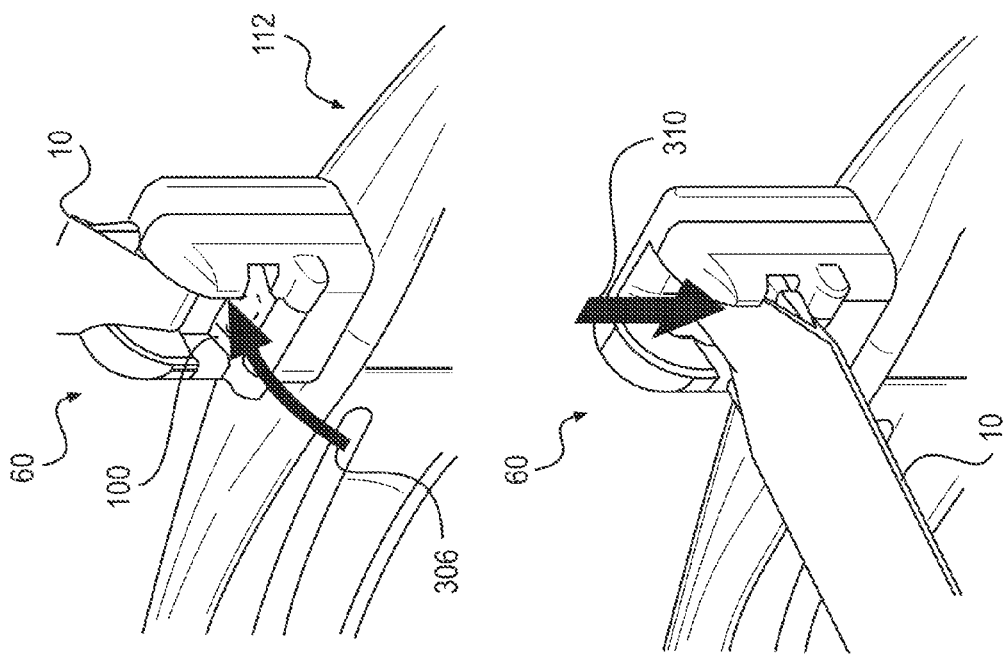
FIG. 9

LIFTING BAR AND LIFTING BAR CONNECTOR

CROSS REFERENCE TO RELATED APPLICATIONS

This application claims the benefit of U.S. Provisional Application Nos. 61/532,300 and 61/532,328, each filed on Sep. 8, 2011, and each of which are hereby incorporated by reference in their entireties.

TECHNICAL FIELD

The present disclosure is directed to a lifting bar and lifting bar connector and, more particularly, to lifting bar and lifting bar connector for use with patient lifts.

BACKGROUND

A patient lift may include a track-riding motor unit configured to ride along an elongated track. The track may be suspended to descend from a ceiling or other elevated structure, which may occupy less space in a room than another lift, such as, a floor lift. A load supporting member, for example, a flexible member such as a strap or cable, may extend from the motor unit and may be wound and unwound to raise and lower a lifting bar. The lifting bar can be secured to a sling, cradle, or other patient support for supporting a patient. A caregiver may use a control unit to control the motor unit to ride along the track and/or raise or lower the lifting bar in order to move the patient as desired.

A variety of lifting bars and lifting bar operations may be available depending on how the patient lift is to be used, i.e., depending on how the patient is to be supported and/or moved. The caregiver may replace one lifting bar with another by disconnecting a lifting bar from the load-supporting member and connecting another lifting bar to the load-supporting member.

As one example, U.S. Pat. No. 7,434,787 ("the '787 patent) describes a ceiling lift having a winch that can be attached to an overhead rail. A lifting strap projects from the winch, and has a free end that is attached to a spreader bar. According to the '787 patent, the extremities of the spreader bar are provided with hooks for attaching a sling or the like holding a patient to be lifted. The spreader bar is directly connected to the winch at a female seat, and there is a quick coupling system provided at the spreader bar and the free end of the lifting strap. The winch may be activated to wind the strap to lift the spreader bar attached thereto.

As another example, U.S. Patent Application Publication No. 2010/0064432 ("the '432 publication") describes a patient lifting device for displacing persons between various positions or areas. The device includes a lift strap extending from a housing to a lifting frame. The '432 publication further discloses that a sling may be removable attached to the lifting frame.

Thus, there is a need for an improved lifting bar and lifting bar connector that is more efficient and convenient to use in a medical lift system.

SUMMARY

In one aspect, a patient lift connector for attaching and detaching a patient lifting bar to a load supporting member in a patient lifting system is described. The connector includes a connector body including a connecting block configured to be fixedly attached to the patient lifting bar. The connector also includes a pin holder coupled to the load supporting member and configured to be inserted through the connector body and into the connecting block, and an attachment latch secured to the connector body and configured to move between an open position and a closed position within the connector body. When the attachment latch moves from the closed position to the open position, the pin holder is allowed to be inserted into the connecting block and thereby allow the lifting bar to be attached to the load supporting member.

In another aspect, a patient lift connector for attaching a patient lifting bar to a load supporting member in a patient lifting system is described. The connector includes a connector body including a connecting block configured to be fixedly attached to the patient lifting bar. The connector also includes a terminating component of the load supporting member that is configured to be inserted through the connector body and into a slot of the connecting block, and an attachment latch secured to the connector body and configured to move between an open position and a closed position within the connector body. The terminating component is configured to move the attachment latch from the closed position to the open position to cause attachment of the lifting bar to the load supporting member, and the slot of the connecting block is covered by another part of the connector body.

In yet another aspect, a method for attaching a patient lifting bar to a load supporting member in a patient lifting system through the use of a connector is described. The method includes pressing a terminating component of the load supporting member against an attachment latch of the connector, wherein the attachment latch is secured to a connector body configured to be connected to the lifting bar. The method further includes moving the terminating component through a part of the connector body and into a slot of a connecting block. The attachment latch is configured to move between an open position and a closed position within the connector body, such that the attachment latch moves to the open position when the terminating component is pressed against the attachment latch and wherein the attachment latch moves to the closed position when the terminating component moves along the slot of the connecting block.

BRIEF DESCRIPTION OF THE DRAWINGS

The accompanying drawings, which are incorporated in and constitute a part of this disclosure, illustrate various embodiments and aspects of the present devices and methods. In the drawings:

FIG. 9 illustrates the detachment of a load supporting member from the assembled lifting bar connector of FIGS. 6 and 7.

DETAILED DESCRIPTION OF EXAMPLE EMBODIMENTS

Figure 1:
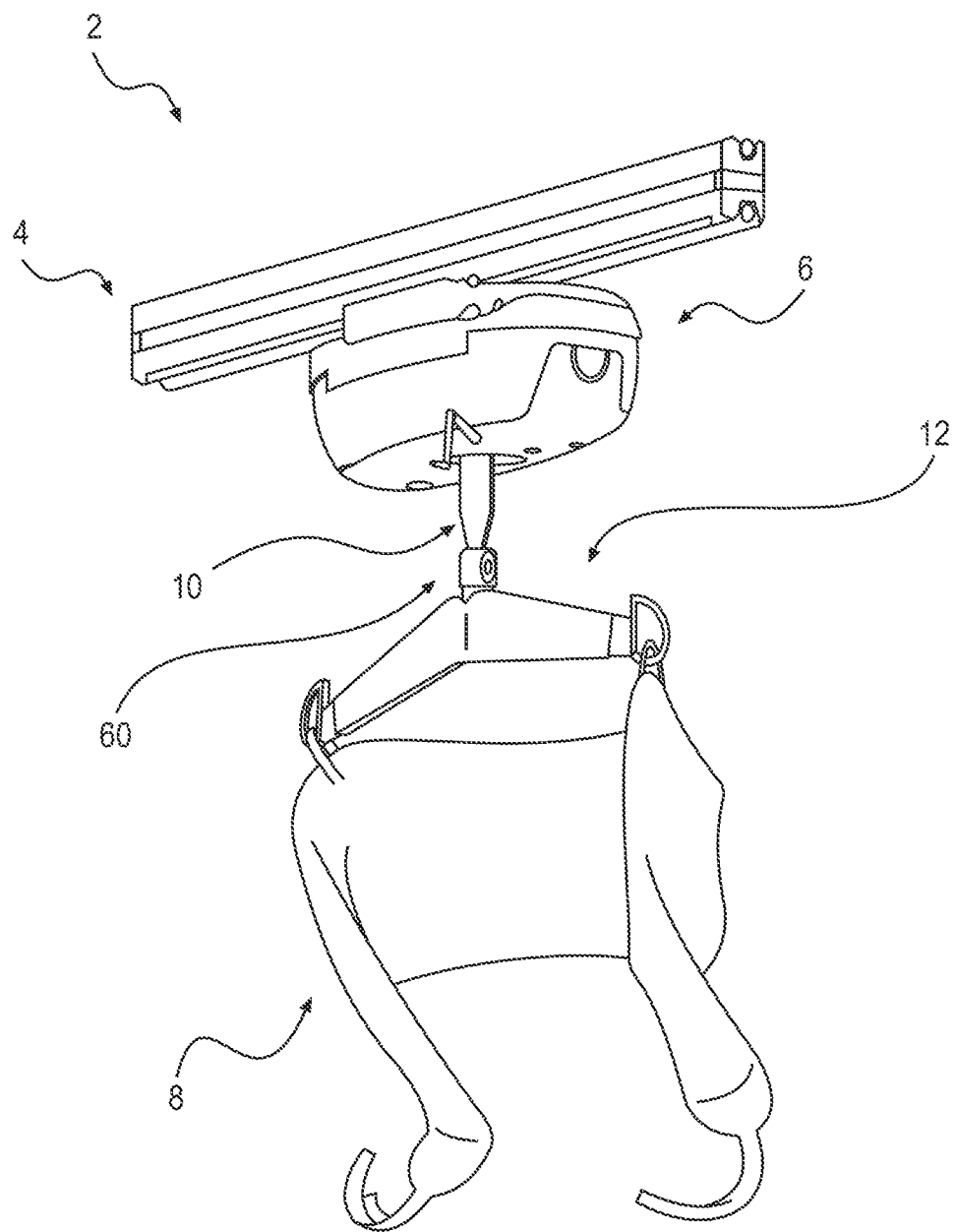
FIG. 1 is a perspective view of a ceiling lift system consistent with the embodiments disclosed herein.

The following description should be read with reference to the drawings wherein like reference numerals indicate like elements throughout the several views. The detailed description and drawings illustrate example embodiments of the claimed device(s) and method(s).

FIG. 1 illustrates a perspective view of a ceiling lift system 2 consistent with exemplary embodiments described herein. The lift system 2 may include a track system 4 suspended from and extending along a ceiling or other wall or elevated structure, and a ceiling lifter 6 may move along the track system 4. The lifter 6 may be manually movable along the track system 4, or the lifter 6 may be a motorized unit automatically movable along the track system 4. A load supporting member 10 may extend from the ceiling lifter 6. In some instances, the load supporting member 10 may extend from an internal space of the ceiling lifter 6, wherein the load supporting member 10 is configured to be wound and unwound by the lifter 6 in order to raise and lower a lifting bar 12. In some instances, the load supporting member 10 may be a flexible load supporting member, such as a strap, cable, rope, or cord, or the load supporting member 10 may be a rigid supporting member made of metals and/or hard plastics, or the like.

Figure 6:
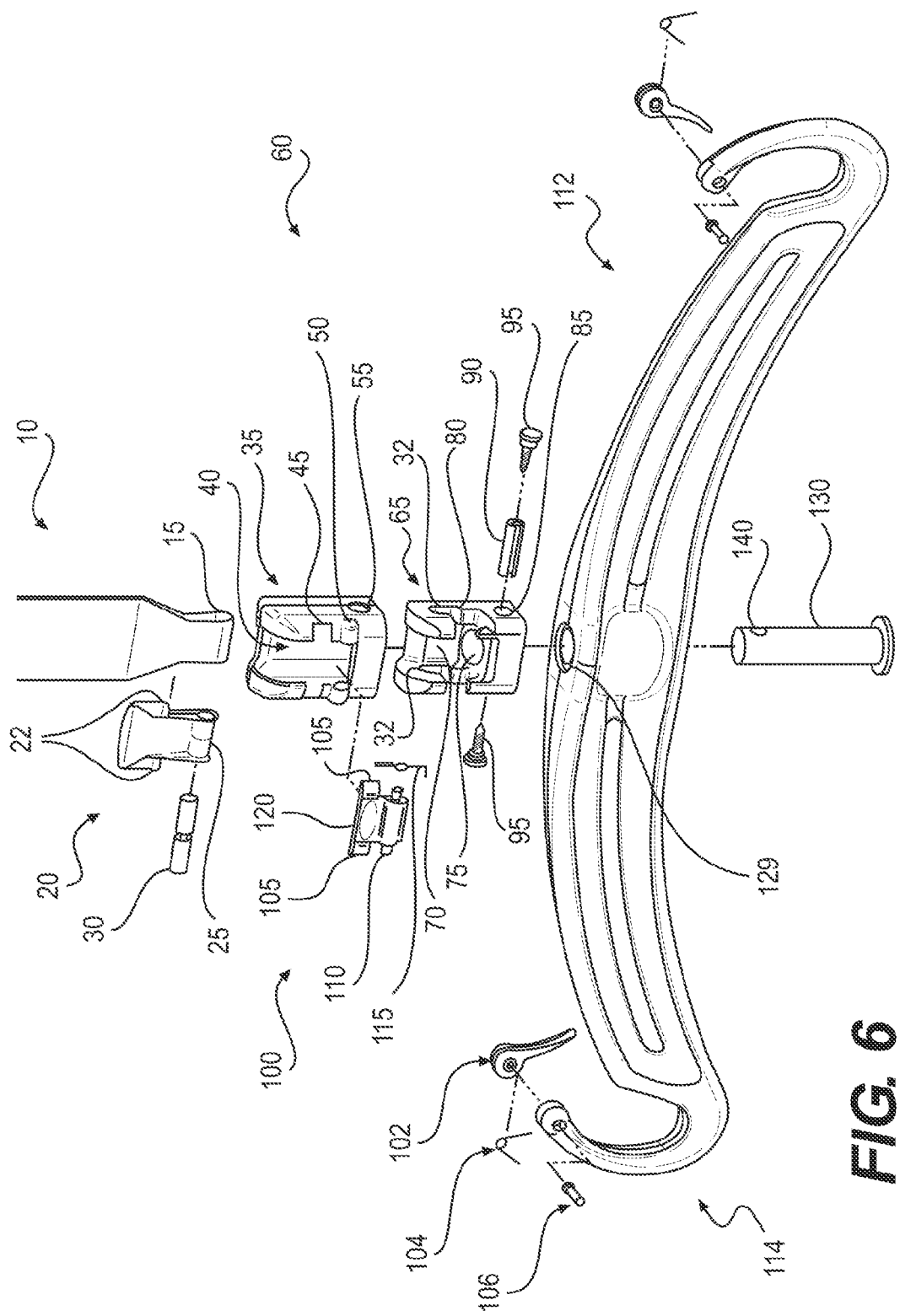
FIG. 6 is an exploded view of the lifting bar connector consistent with the disclosed embodiments and shown as connected to the lifting bar of FIG. 4.
Figure 7:
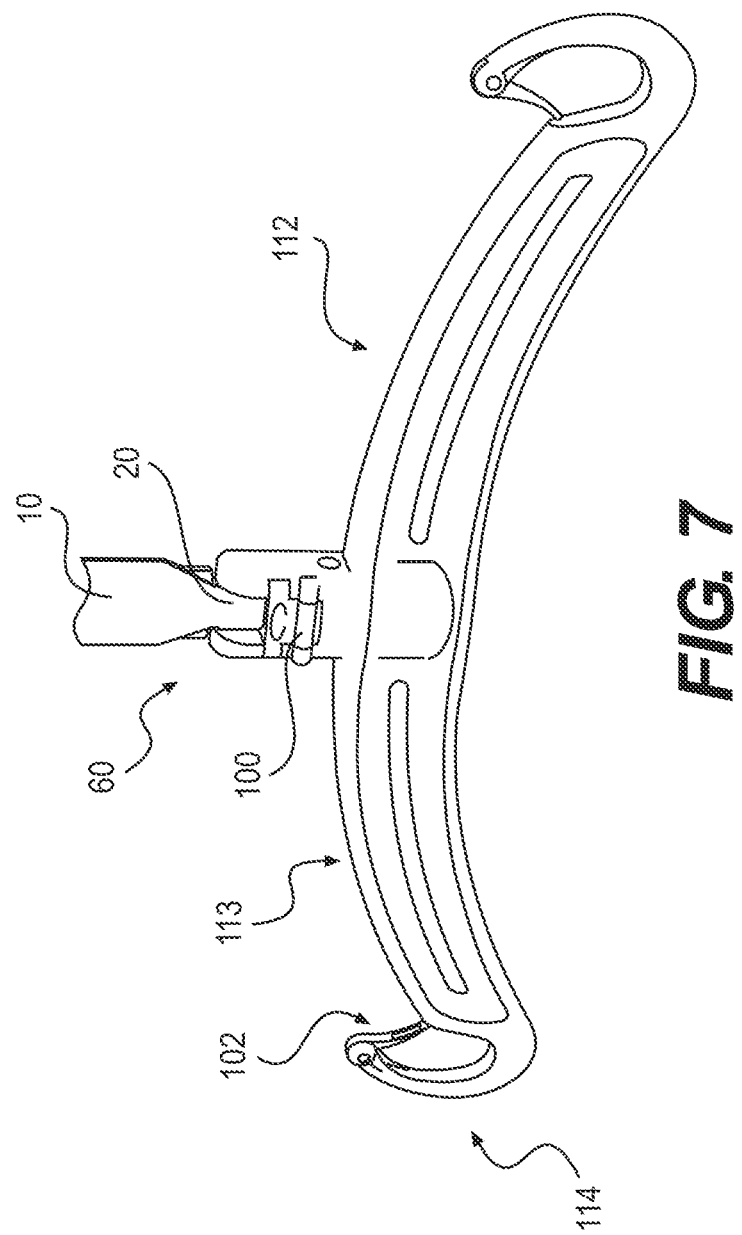
FIG. 7 is an assembled view of the lifting bar connector of FIG. 6.
Figure 8:
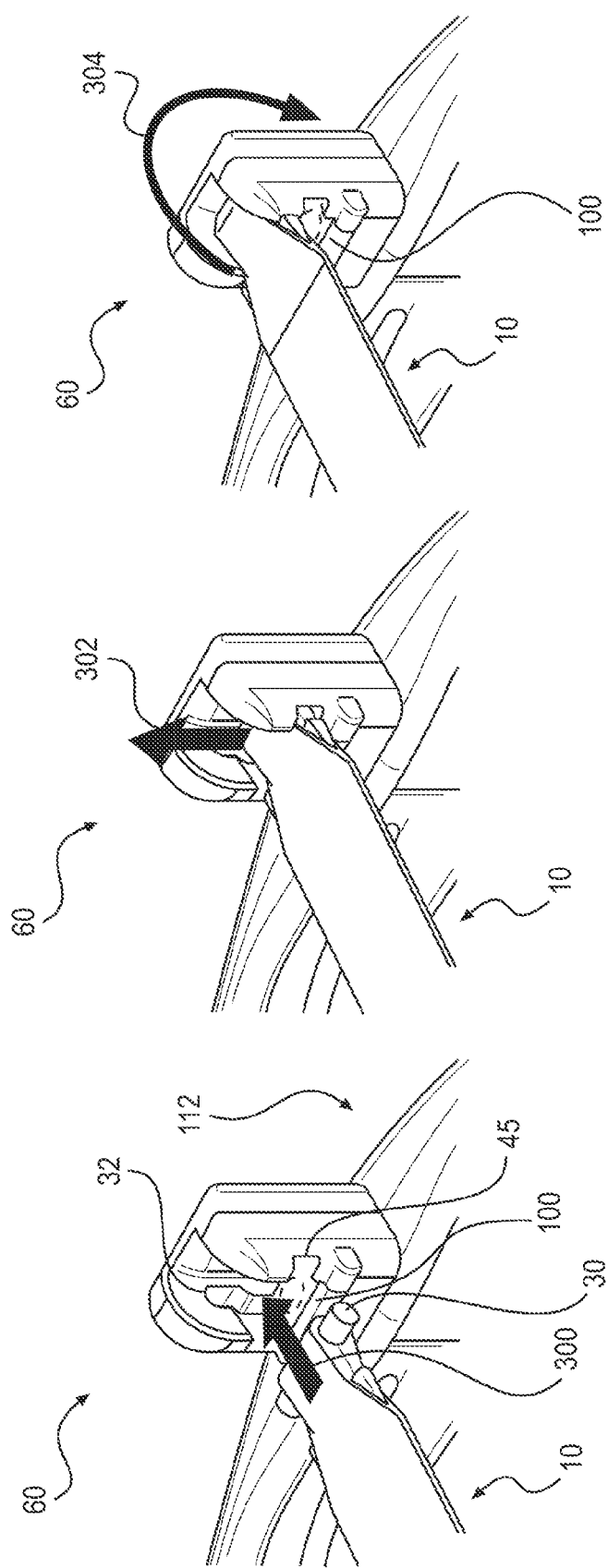
FIG. 8 illustrates the attachment of a load supporting member to the assembled lifting bar connector of FIGS. 6 and 7.

The lifting bar 12 may be connected to the load supporting member 10 via a connector 60, which is described in more detail with respect to FIGS. 6-8. Although the ceiling lift system 2 shown in FIG. 1 includes the lifting bar 12 according to a first exemplary embodiment, another lifting bar embodiment, such as the lifting bar 112 of a second exemplary embodiment described herein with respect to FIGS. 4, 6, and 7, may also be used. Furthermore, either lifting bar 12 or 112 may also be referred to as a supporting bar, a spreader bar, a lifting member, or the like. Additionally, a patient support 8, such as a sling, cradle, or other device, may be connected to the lifting bar 12 for movably supporting a patient. The patient support 8 may also be referred to herein as a patient lift apparatus. The lift system 2 may further include a control unit (not shown), such as a wired or wireless handheld button controller, for electrically communicating with the lifter 6 to instruct the lifter 6 to ride along the track system 4 and/or raise or lower the lifting bar 12 to move a patient supported in the patient support 8.

Figure 2:
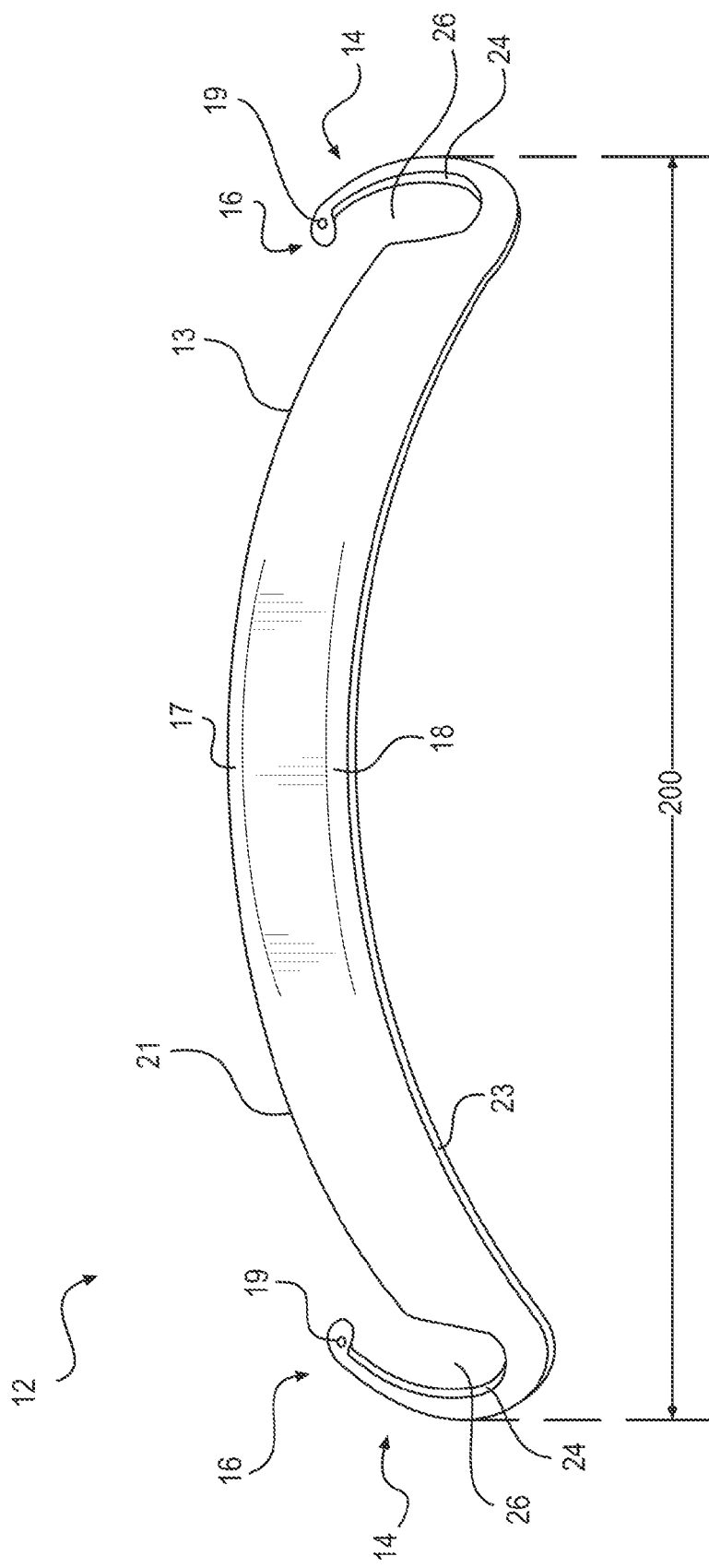
FIG. 2 is a front view of a lifting bar according to a first exemplary embodiment.

FIG. 2 shows a front view of the lifting bar 12 separated from the ceiling lift system 2 shown in FIG. 1. The lifting bar 12 may be an elongated member that includes an elongated main body 13, which may include ridges 17 and 18 protruding from one or more sides of the lifting bar 12. The lifting bar 12 can also include support connectors 14 extending from opposite ends of the main body 13. The support connectors 14 may be hooks, clasps, clips, or any other supporting and/or fastening member. Each support connector 14 may include an end 16 having an aperture 19 extending therethrough. As shown in FIG. 2, in some instances, the end 16 may be rounded, such that it exhibits a spherical or cylindrical shape. The aperture 19, which may either extend all the way through the end 16 or only a portion of the way through the end 16, is configured to receive a component, such as a safety mechanism 28. The support connectors 14 can allow connection of the load supporting member 10 to the lifting bar 12 (FIG. 1). As described in more detail below, the support connectors 14 can be formed into the main body 13 of the lifting bar 12 so that the lifting bar 12 is a single element. The support connectors 14 may each form or define a space 26 for receiving a portion of the patient support 8. The space 26, which may also be referred to as a depression, socket, gap, or the like, can include a supporting surface 24 located on an inner side of each support connector 14. The safety mechanism 28, which can be a latch, clasp, fastener, or other similar movable mechanism, can be movably attached to the support connector 14 to prevent the patient support 8, such as a strap of a sling in contact with the supporting surface 24, from unintentionally exiting the space 26.

Although two support connectors 14 are shown in FIG. 2, additional support connectors 14 could be formed as part of the lifting bar 12. The main body 13 of the lifting bar 12 also includes a first surface 21 and a second surface 23 on an opposite side of the main body 13 as the first surface 21. Because the lifting bar 12 may be arranged in the ceiling lift system 2 as shown in FIG. 1, the first surface 21 may be referred to as an upper surface, and the second surface 23 may be referred to as a lower surface.

Figure 3:
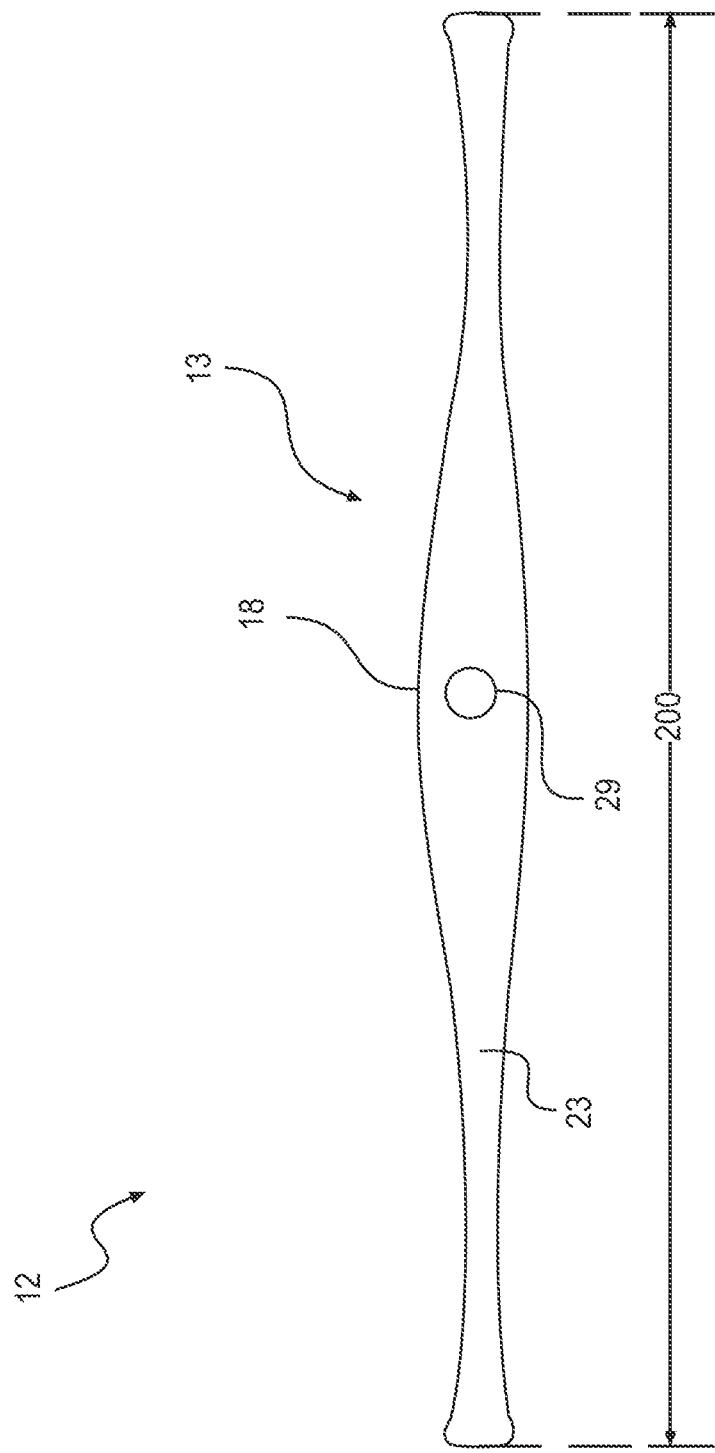
FIG. 3 is a bottom view of the lifting bar of FIG. 2.

As shown in FIGS. 2 and 3, the lifting bar 12 may have a length 200 extending from an outermost edge of one support connector 14 to an outermost edge of another support connector 14 disposed on an opposite end of the main body 13 of the lifting bar 12. In some instances, the length 200 may be between about 30.5 and 61.0 cm (between about 12.0 and 24.0 inches). For example, in one implementation, the length 200 may be about 45.7 cm (about 18.0 inches). The lifting bar 112 of FIGS. 4, 6, and 7 may have dimensions similar to those of the lifting bar 12. These values are examples only, as the lifting bars 12, 112 may have a variety of other lengths depending on, for example, the size of the patient to be supported by the ceiling lift system 2.

Figure 4:
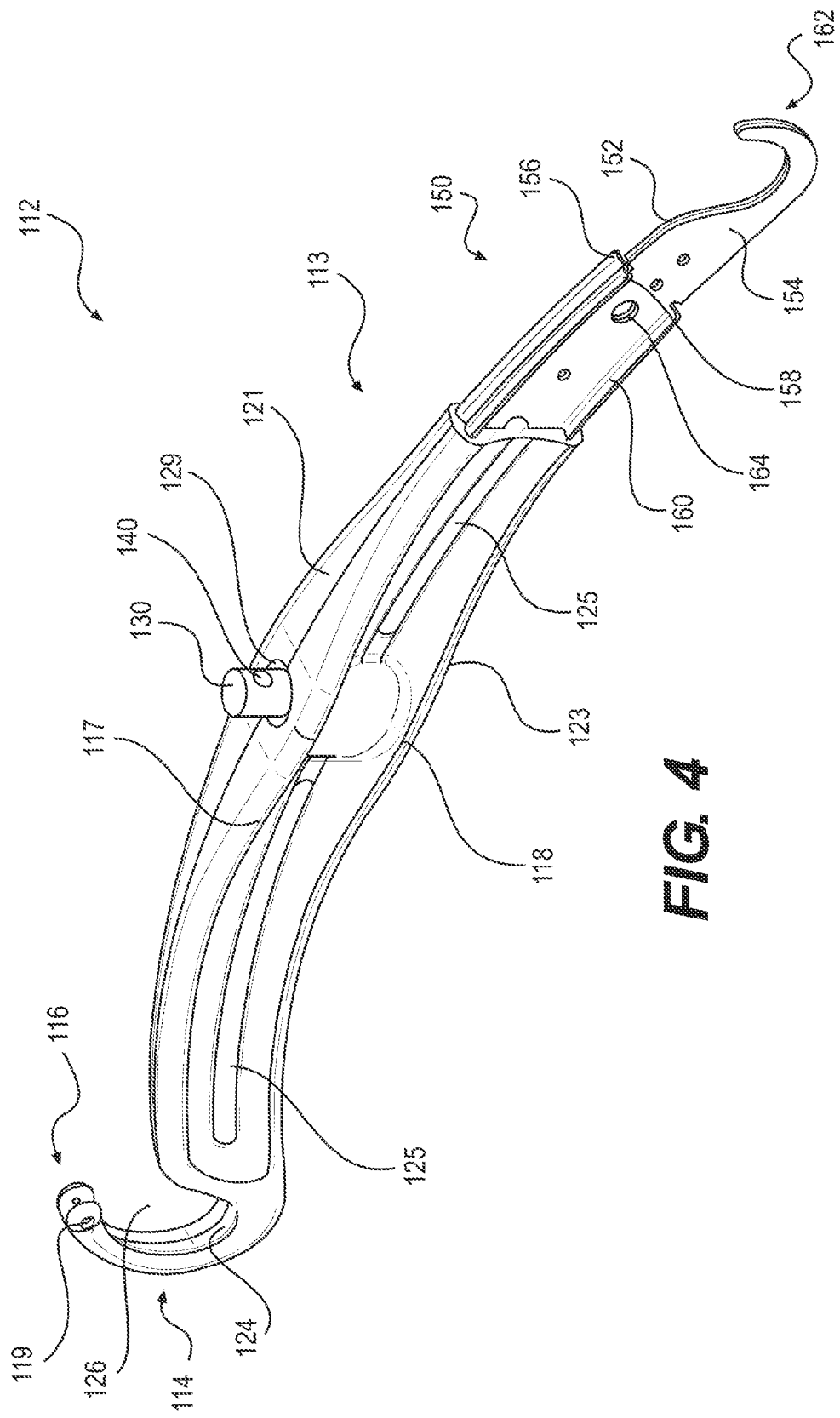
FIG. 4 is a partially cutaway perspective view of a lifting bar according to a second exemplary embodiment.

FIG. 3 shows a bottom view of the lifting bar 12 shown in FIG. 2, that is, the second (lower) surface 23 shown in FIG. 3. The lifting bar 12 can include a lifting bar aperture 29, which can be a through-hole extending from the lower surface 23 to the upper surface 21 and configured to receive a lifting bar pin 130 (FIGS. 4 and 6). Although the lifting bar aperture 29 shown in FIG. 3 is circular, other shapes could be provided, such as, oval-like or rectangular to accommodate lifting bar pins having a variety of cross-sectional shapes. Additionally, while the lifting bar aperture 29 is shown in FIG. 3 at a location at or near the middle of the length 200 of the lifting bar 12, other types of apertures may be used. For example, the lifting bar 12 may include two apertures equally spaced from the center of the lifting bar 12.

FIG. 4 is a partially cutaway perspective view of a lifting bar 112 separated from the ceiling lift system 2 according to another example embodiment. The lifting bar 112 may be an elongated member. However, while the lifting bar 12 depicted in FIGS. 2 and 3 may be manufactured as a single, solid component, the lifting bar 112 shown in FIG. 4 may also include an inner core 150 extending through portions of a separate lifting bar main body 113 and/or portions of one or more support connectors 114. The portion of the inner core 150 extending through and surrounded by one or more support connectors 114 may be referred to as the inner core support connectors 162. The inner core 150 may have a variety of configurations to extend through any portion of the main body 113 and support connectors 114 of the lifting bar. The inner core 150 may be made of any material; for example, durable materials such as metals or hard plastics. In some instances, the inner core 150 may be referred to as a metallic beam. Also, in some embodiments, the material from which the inner core 150 is made is harder than the material forming the lifting bar main body 113 and support connectors 114, which together may be referred to as a skeletal support structure for the inner core 150.

The inner core 150 may include a plurality of sheets. For example, inner core 150 may include a first sheet 152 and a second sheet 154 having faces in contact with one another. The sheets 152, 154, which may also be referred to as plates, may be connected via any fastening or adhering configuration, such as welding, riveting, or applying an adhesive on the contacting faces. In some instances, the sheets 152, 154 forming the inner core may be metallic or made from a hard plastic. FIG. 4 shows the inner core 150 formed of a plurality of layered sheets 152, 154. Flanges 156, 158, 160 may extend from the sheets 152, 154. As shown in FIG. 4, a first flange 156 extends from the first sheet 152, and second and third flanges 158, 160, respectively, extend from the second sheet 154. A fourth flange (not shown) may extend from the first sheet 152 in a direction opposite the third flange 160. The inner core 150 may also include holes 164, which may be retaining pin holes, formed in the inner core 150 so that the inner core 150 can be held in place during a molding process, which is described in more detail below. Although the inner core 150 is described herein as having various features, the inner core can have other shapes and features, and/or be made of a material other than metal. Also, as described in more detail below, the inner core 150 can have a shape and features similar to the lifting bar main body 113 and supporting connectors 114 that are formed over the inner core 150.

The lifting bar main body 113 may include a first, or upper, surface 121 and a second, or lower, surface 123 located opposite the first surface 121. A first ridge 117 and a second ridge 118 may protrude from one or more sides of the lifting bar 112. Additionally, the lifting bar 112 can include strips 125 and/or holes extending along the length of the lifting bar 112, which may be the result of a first molding process, and which can be filled in with a material during a second molding process, as described in more detail below.

As described herein, the lifting bar 112 can include support connectors 114 at opposite ends of the main body 113. The support connectors 114 may be hooks, clasps, clips, or any other supporting and/or fastening member. Each support connector 114 may include an end 116 having an aperture 119 extending therethrough. As shown in FIG. 4, in some instances the end 116 may be rounded, such that it exhibits a spherical or cylindrical shape. The aperture 119, which may either extend all the way through the end 116 or only a portion of the way through the end 116, is configured to receive a component, such as a safety mechanism 102 (FIG. 6). The support connectors 114 can allow connection of the load supporting member 10 (FIG. 1) to the lifting bar 112. As described in more detail below, the support connectors 114 can be formed with the main body 113 of the lifting bar 112 so that the main body 113 and support connectors 114 are a single element. The support connectors 114 may each form or define a space 126 for receiving a portion of the patient support 8. The space 126, which may also be referred to as a depression, socket, gap, or the like, can include a supporting surface 124 located on an inner side of each support connector 114. Although two support connectors 114 are shown in FIG. 4, additional support connectors 114 could be formed as part of the lifting bar 112.

Figure 5:
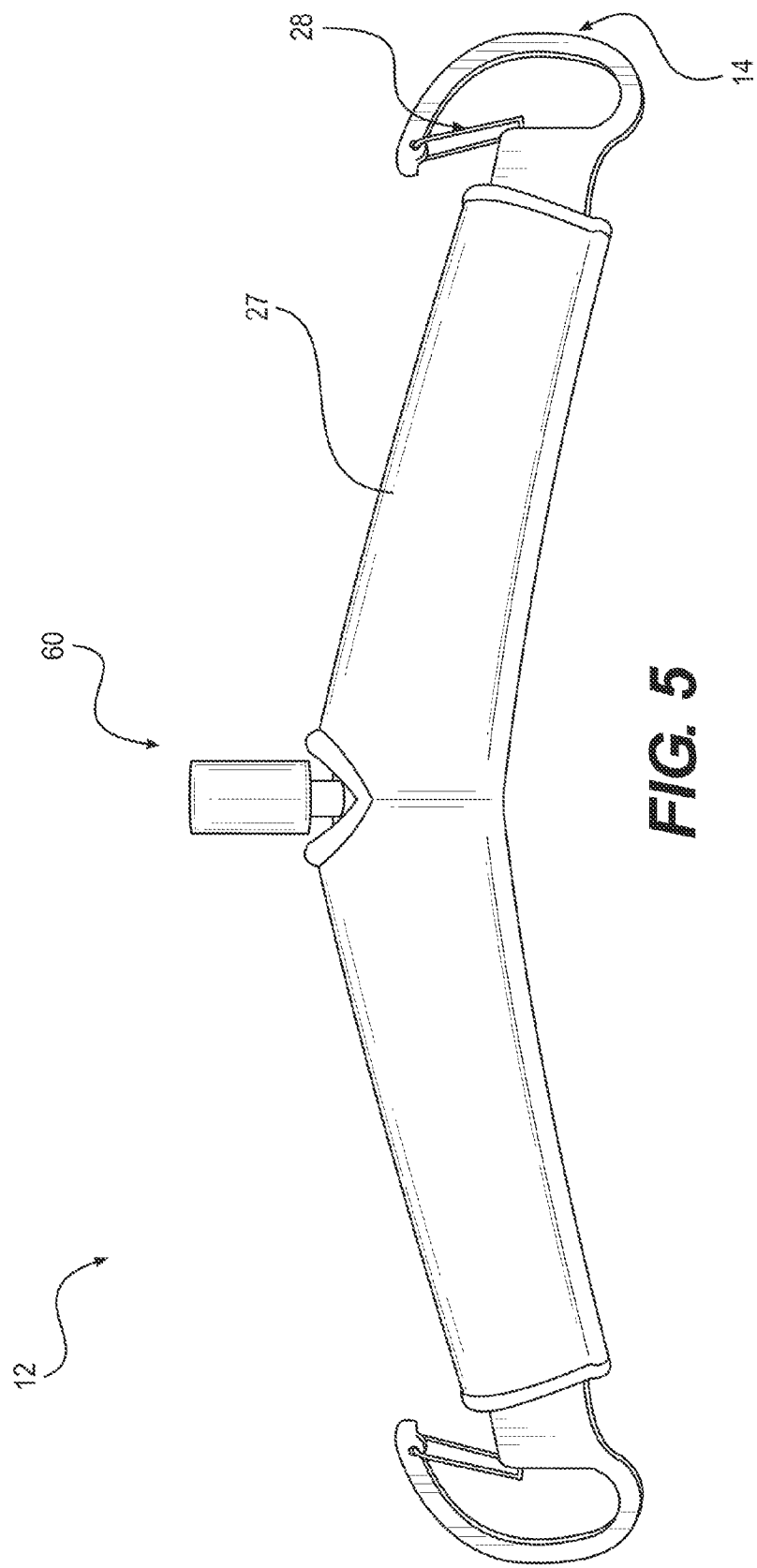
FIG. 5 is a view of a cover disposed on the lifting bar of FIG. 1.

Similar to the lifting bar 12 as illustrated in FIG. 5, the safety mechanism 102, such as a safety latch, may prevent the patient support 8 from unintentionally detaching from the lifting bar 112. The safety mechanism 102 may have various configurations that reduce the likelihood that the patient support 8 will unintentionally detach from the lifting bar 112, while allowing for intentional detachment of the patient support 8 from the lifting bar 112. As shown in FIG. 6, the safety mechanism 102 can be secured to either the support connector 114, for example, at the end 116 of the support connector through the aperture 119, or to the lifting bar body 112. The safety mechanism 102 may also be formed integrally with the lifting bar main body 113 or with the support connector 114. This integral formation may ensure that there are no interruptions, such as gaps or other joints, between the safety mechanism 102 and the lifting bar main body 113 or the support connector 114.

The lifting bar 112 may include a lifting bar aperture 129 for receiving a lifting bar pin 130. Similar to the lifting bar aperture 29 of the lifting bar 12 shown in FIG. 3, the lifting bar aperture 129 can be a through hole extending from the lower surface 123 to the upper surface 121. Additionally, as shown in FIG. 4, the lifting bar pin 130 may include a lifting bar pin aperture 140 configured to receive a connecting block pin 90 therethrough (FIG. 6).

FIG. 5 shows a cover 27 removably disposed on the lifting bar 12 of FIG. 1. The cover 27 may be any type of removable protective padding to cover at least a portion of the lifting bar 12. For example, the cover 27 may cover a substantial amount of the main body 13 of the lifting bar 12, while leaving the support connectors 14 uncovered. The cover 27 may be wrapped or secured around the lifting bar 12 in a number of ways, for example, using a fastening device such as a zipper or hook-and-loop fasteners disposed along a side of the cover 27. Although the cover 27 is shown as being disposed on the lifting bar 12, the cover 27 may also be used to cover the lifting bar 112 shown in FIGS. 4, 6, and 7.

FIG. 6 shows an exploded view of an exemplary connector 60 for the lifting bar 112 shown in FIG. 4. Although the connector 60 is shown as being connected to the lifting bar 112, the following description related to the lifting bar 112 and the lifting bar connector 60 may also be applicable to the lifting bar 12 shown in a described with respect to FIGS. 1-3 and 5. As described herein, a safety mechanism 102, such as a latch, can be provided with the lifting bar 112. The safety mechanism 102, which can be connected to a safety mechanism spring 104, may be connected to the end 116 of the support connector 114 via a safety mechanism pin 106. When assembled (FIG. 7), the spring 104 can bias the safety mechanism 102 to a closed position in which the safety mechanism contacts the main body 113 of the lifting bar 112 (FIG. 7). Providing the described safety mechanism 102 arrangement, including the spring 104, can reduce the likelihood that the patient support 8 will unintentionally detach from the lifting bar 112, while allowing for intentional detachment of the patient support 8 from the lifting bar 112.

The connector 60 may include the load supporting member 10, for example, a flexible load supporting member such as a strap. In some instances, a portion of the load supporting member 10 may be a slot 15 for receiving a pin holder 20. The slot 15 and pin holder 20 may be collectively referred to as a terminating component of the load supporting member, a terminating member, or the like. In some embodiments, the slot 15 may be replaced with a clasp, hook, buckle, or any other connecting or affixing mechanism capable of interfacing with a connecting block cover 35 and/or a connecting block 65, either directly or via another component, such as the pin holder 20. The pin holder 20 may include a pin holder drum 25 configured to receive a pin 30 therethrough, and a pair of wings 22. The pin holder 20 may alternatively or additionally include a clasp, hook, buckle, or any other connecting mechanism suited to interface with the connecting block cover 35 and/or the connecting block 65. In some instances, the pin holder drum 25 and pin 30 may be integrated. Additionally, in an example embodiment, the pin holder drum 25 may be formed as a separate component, and may be hingedly secured to a pin holder to allow the pin holder and the pin holder drum 25 to be adjustable.

The connector 60 may include a connector body, which, in some instances, is comprised of the connecting block cover 35 and the connecting block 65. The connecting block cover 35 may have a block cover socket 40 for receiving the connecting block 65 and the pin holder drum 25 therein. The connector body may also include indents 45 in the block cover 35 formed in a surface thereof, which allow the pin holder drum 25 and pin 30 to pass therethrough. First pin apertures 50 of the block cover 35, also referred to as latch pin apertures 50, may be configured to receive latch pins 110 therethrough, and second pin apertures 55 of the block cover 35, also referred to as connecting block cover pin apertures, may be configured to receive a connecting block pin 90 therethrough. The connecting block pin 90 may also be configured to receive a connecting block pin cover 95 therethrough. The block cover socket 40 may be situated at any position in the connecting block cover 35, for example, along another desired axis. It can have any configuration capable of accepting all or a portion of the connecting block 65 therein, and the connecting block 65 may be non-removably received within the block cover socket 40. The block cover indents 45 may have any desired configuration that allows a portion of the pin holder 20, pin holder drum 25, and/or load supporting member 10 to pass. In some instances, however, the block cover indents 45 may not allow another portion of the pin holder 20 to pass therethrough. The block cover indents 45 can be formed in any portion of the connecting block cover 35 and are not limited to being formed in both sides of the cover 35 or in the front of cover 35. For example, one or more indents, apertures, or openings could allow the load supporting member 10 to be inserted from the side of the connecting block cover 35. In some embodiments, the block cover indents 45 may not be formed in cover 35, and may be additionally or alternatively formed in the connecting block 65. The block cover first pin apertures 50 may be any mechanism for interfacing with an attachment latch 100, and may include, for example, spring-biased surfaces that secure the attachment latch 100 to either the connecting block cover 35 or the connecting block 65 by sandwiching a portion of the attachment latch 100. The block cover second pin apertures 55 and/or a connecting block second apertures 85 can alternatively or additionally include any mechanism for securing the connecting block cover 35 and the connecting block 65 together. For example, spring-biased surfaces configured to squeeze portions of the connecting block cover 35 and/or the connecting block 65 may be provided in place of the connecting block pin 90.

As shown in FIG. 6, the connecting block 65 may include one or more slots 32 for receiving a portion of the pin holder 20 and/or the load supporting member 10. For example, the pin 30 may be received within the slots 32. The connecting block 65 may also include a connecting block socket 70 and a connecting block cavity 80 for receiving the pin holder drum 25 and the pin 30 therein. A connecting block first aperture 75 may be provided for receiving a lifting bar pin 130 therethrough. Also, the connecting block second apertures 85, which may be referred to as connecting block apertures, may be provided for receiving a connecting block pin 90 therethrough. In some instances, the connecting block 65 and the connecting block cover 35 are integrated into one component by, for example, providing the connecting block 65 with a block cover first pin aperture. The connecting block socket 70 can be situated at any position in the connecting block 65. For example, socket 70 may open along another desired axis. The connecting block socket 70 may have any configuration capable of accepting all or a portion of the pin holder 20 (including the pin holder drum 25), the load supporting member 10, and/or the pin 30. In some instances, the connecting block 65 and/or the connecting block cover 35 are not secured to the lifting bar 112 using a lifting bar pin 130. Instead, for example, these components may be molded together as integrated components, such that the lifting bar pin 130 is not necessary.

The connector 60 can further include an attachment latch 100 having latch flanges 105 that may be complimentary to the block cover indents 45 such that the latch flanges may fit within the block cover indents 45. Latch pins 110 of the attachment latch 100 may be receivable within the block cover first pin apertures 50. The attachment latch 100 may further include an attachment latch main body 120, which, in some embodiments, can have a finger depression formed therein, and an attachment latch biasing element 115, such as a spring, for biasing the attachment latch 100 towards a "closed" position. In the closed position, the latch flanges 105 can abut the connecting block cover 35 at the block cover indents 45. The attachment latch 100 may not be hingedly or swingably secured to the connecting block cover 35 or the connecting block 65 in some instances. The attachment latch 100 may instead have, for example, a push-button configuration in which the latch 100 opens and closes by being pressed into the connecting block socket 70, rather than "swinging" into the connecting block socket 70. Alternatively, the attachment latch 100 may swing along a different axis or edge. The latch pins 110 may be replaced with any connecting, fastening, or securing mechanism for securing the attachment latch 100 to the connecting block cover 35. For example, rather than latch pins 110 being received within the block cover first pin apertures 50, a portion of the attachment latch 100 may be slid into a latch pocket or similar structure formed in the connecting block cover 35 or connecting block 65. In some instances, an additional latch may be provided in the connecting block socket 70 to control the movement of the pin holder drum 25 while the pin holder drum 25 is situated in the connecting block socket 70.

The lifting bar 112 may be integrated with the connecting block 35 and/or the connecting block cover 65. Additionally, the connector 60 described herein or the various components that comprise the connector 60 can be sculpted, carved, or otherwise formed in the lifting bar 112. For example, the load supporting member 10 can be secured to the lifting bar 112 by inserting a portion of the member 10 into the connecting block socket 70 that may be carved into the lifting bar 112, for example, by pushing an attachment latch secured to the lifting bar 112. A thrust bearing may also be provided between the lifting bar pin 130 and the lifting bar 112 to ease rotation between the lifting bar pin 130 and the lifting bar 112. As shown in FIG. 6, the lifting bar pin 130 can include a lifting bar pin aperture 140 configured to receive the connecting block pin 90 therethrough. Although FIG. 6 illustrates the connector 60 being used with the lifting bar 112 shown in FIG. 4, the connector 60 may also be used with the lifting bar 12 shown in FIGS. 1-3 and 5, or with various other lifting bar embodiments.

Referring to the assembled connector 60 in FIG. 7, which shows the attachment latch 100 in the closed position, the connecting block 65 shown in FIG. 6 is situated in the connecting block cover 35, and the connecting block 65 and block cover 35 are secured to the lifting bar 112 using the lifting bar pin 130. The load supporting member 10 having the pin holder 20 within the slot 15 is secured to the lifting bar 112 via the connecting block 65 and block cover 35. The attachment latch main body 120 covers the connecting block socket 70, and the latch flanges 105 cover the block cover indents 45 (FIG. 6). This configuration may help to secure the load supporting member 10 by preventing the pin holder drum 25 from being moved out of the connecting block socket 70 via the block cover indents 45. The attachment latch 100 may be spring biased using the attachment latch biasing element 115, such that the attachment latch 100 can swing in a forward direction to move the attachment latch main body 120 and the latch flanges 105 into the connecting block socket 70. In some instances, however, the attachment latch 100 may be prevented from swinging further in an opposite backward direction than the closed position, which may help maintain the pin holder drum 25 and pin 30 within the connecting block socket 70.

Referring to FIG. 8, to secure the load supporting member 10 to the lifting bar 112, part of the terminating component, such as the pin holder 20 or pin holder drum 25, may be pressed against the attachment latch main body 120, as shown by arrow 300, to swing the attachment latch 100 into the connecting block socket 70. Doing so moves the attachment latch 100 between an open position and the closed position, for example, from the closed position to the open position. In some instances, the pin holder drum 25 can be pressed against the attachment latch main body 120 in a direction that is substantially perpendicular to the connecting block 65, as shown in FIG. 8. The attachment latch 100, however, can be spring biased against the open position, that is, biased to the closed position. Therefore, once the pin holder drum 25 and pin 30 have been moved past the attachment latch 100, the attachment latch 100 swings back into the closed position such that the flanges 105 of the attachment latch 100 abut the block cover indents 4, as shown in FIG. 7. The load supporting member 10, the pin holder 20, and/or the pin 30 can then be lifted upwardly and slide into slots 32, as shown by arrow 302. After being lifted and with the attachment latch 100 in the closed position, the load supporting member 10, pin holder 20, and/or pin 30 may be rotated within the slots 32 in a first direction approximately 90°, as shown by arrow 304, thereby positioning the wings 22 at least partly above the connecting block cover 35. Once the wings 22 are in place, the pin holder 20 may resist downward motion as the wings 22 abut the top of the connecting block cover 35. In this manner, the load supporting member 10 can be secured to the connecting block 65, which is secured to the connecting block cover 35 and the lifting bar 112. In some instances, the attachment latch 100 may remain in the open position until the load supporting member 10, pin holder 20, and/or pin 30 is rotated within the connector block 65 so that the wings 22 abut the top of the connecting block cover 35. Although the lifting bar 112 is shown in FIG. 8, the attachment (and detachment) methods described herein may be applied to the lifting bar 12 of FIG. 2 in a similar manner.

Referring to FIG. 9, to detach the load supporting member 10 from the lifting bar 112, the attachment latch 100 may be pressed or pushed forwards, as shown by arrow 306, manually by a user or automatically, into its open position. When the attachment latch 100 is pressed, the load supporting member 10 may be detached from the connecting block 65 by, for example, rotating the load supporting member 10, the pin holder 20, and/or the pin 30 within the slots 32 in a second direction downwardly approximately 90°, as shown by arrow 308, thereby helping to clear the wings 22 from the top of the connecting block cover 35. In some instances, when the attachment latch 100 is pressed, the load supporting member 10 may be detached from the connecting block 65 by lowering or moving (e.g., sliding) the load supporting member 10, the pin holder 20, or the pin 30 in a downward direction within, for example, the slots 32 of the connecting block cover 65, as shown by arrow 310. This method of detachment may allow the load supporting member 10, the pin holder 20, and/or the pin 30 to be separated from the connecting block 65 by moving the pin holder drum 25 and pin 30 out of the connecting block cavity 80 and past the block cover indents 45, as shown by arrow 312. In some instances, the load supporting member 10, pin holder 20, and pin 30 may be moved in a direction that is substantially perpendicular to the connecting block 65 during detachment. Once the pin holder drum 25 and the pin 30 have moved past the block cover indents 45, the attachment latch 100 can be allowed to return to its closed position.

Various modifications of the devices and methods described herein may be provided. For example, the connector 60, and more specifically the connector body, may be provided without the connector block cover 35 for covering the connector block 65. If no connector block cover 35 is provided, other portions of the connector 60, such as the connector block 65, may include any of the features of the connector block cover 35. For example, the connector block 65 can be configured to receive and/or support the attachment latch 100 by having additional apertures or depressions configured to receive the latch pins 110 to rotatably support the attachment latch 100 in the connector block 65.

Additionally, the pin holder 20 and/or load supporting member 10 may be provided with a mechanism to change the width or other dimension(s) of the pin holder drum 25, such that the pin holder drum 25 may pass into the connecting block socket 70 as desired. For example, the pin holder 20, pin holder drum 25, and/or load supporting member 10 may include a retractable, spring-biased flange that includes a portion that is external to the pin holder drum 25. By pressing, for example, a button or the flange itself, the flange can retract in an inward direction, partly or entirely into the pin holder 20, pin holder drum 25, and/or load supporting member 10, thereby allowing manipulation of the dimensions of the pin holder 20, pin holder drum 25, and/or load supporting member 10. This may allow the pin holder 20, pin holder drum 25, and/or load supporting member 10 to fit past an opening, such as the block cover indents 45, that opens onto the connecting block socket 70. When the flange is in the connecting block socket 70, the flange may be released or otherwise allowed to protrude again, which can prohibit the pin holder 20, pin holder drum 25, and/or load supporting member 10 from exiting the connecting block socket 70 until the flange is again retracted.

Additionally, the lifting bars 12, 112 described herein can have a variety of other configurations capable of interfacing with the ceiling lift system 2. For example, the lifting bars 12, 112 can include multiple bars, connectors, sockets, apertures, and the like. Furthermore, the lifting bars 12, 112 may be integrated with the load supporting member 10, or at least a portion thereof so as to provide a smooth and uninterrupted transition from the load supporting member 10 to the lifting bars 12, 112.

Figure 10:
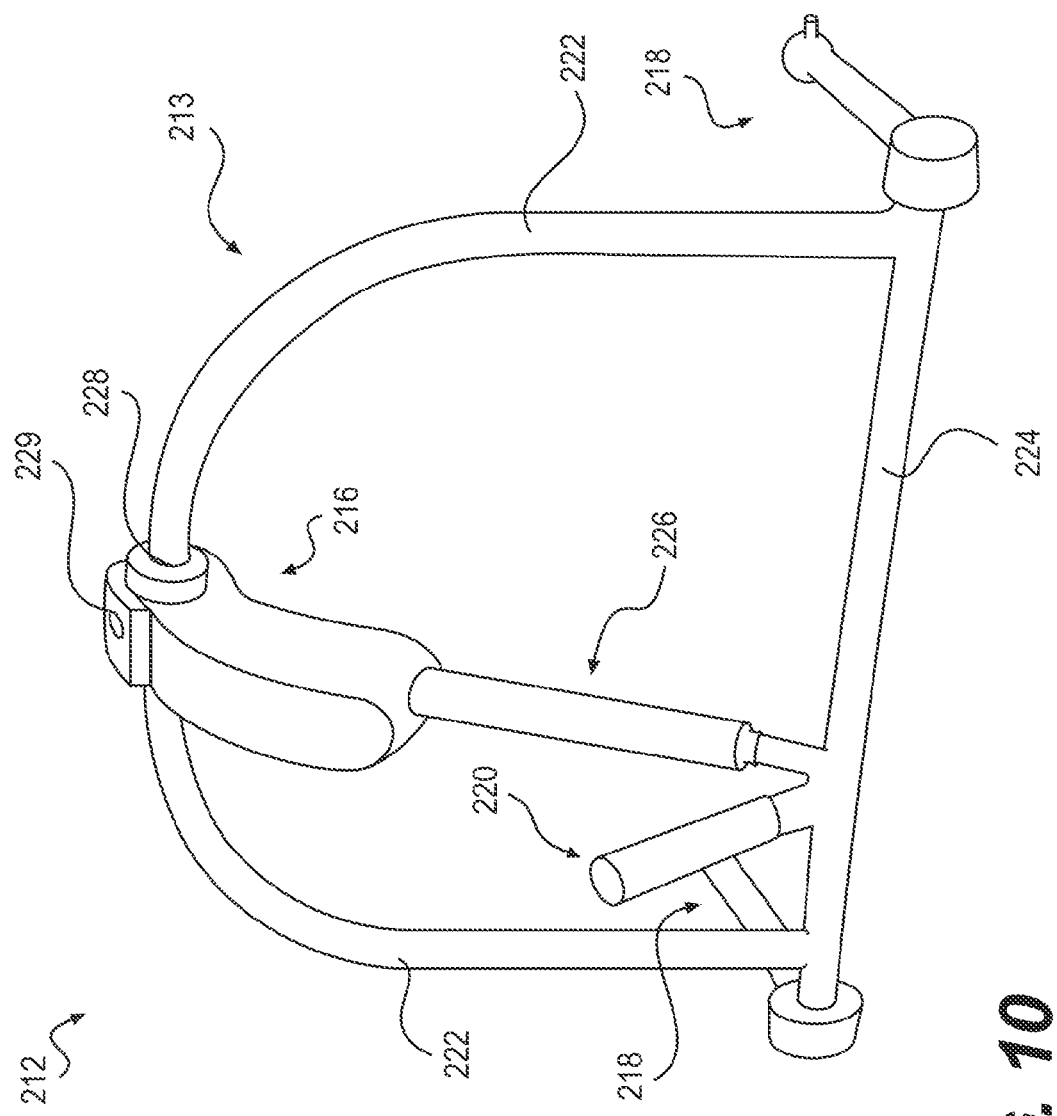
FIG. 10 is a perspective view of a lifting bar according to a third exemplary embodiment.

FIGS. 10-14 depict a variety of additional embodiments of the lifting bar. FIG. 10 illustrates a third example embodiment of a lifting bar 212 according to the present disclosure. The lifting bar 212 includes a main body 213 having curved structural members 222, a cross member 224, a supporting member 216, and a connecting member 226. The curved structural members 222 may extend through an opening 228 in the supporting member 216. In some instances, the opening 228 is a through hole extending entirely through the supporting member 216, in which case the plurality of curved structural members 222 may be provided as a single structural member 222 connecting to opposite ends of the cross member 224. The lifting bar 212 may also include support connectors 218. The support connectors 218 may extend from the main body 213 and include a variety of configurations, such as the spherical configuration shown in FIG. 10, that may function as safety mechanisms and help retain a patient support attached to the lifting bar 212. In some instances, the lifting bar 212 may also include a handle 220 for maneuvering the lifting bar 212. A lifting bar aperture 229 may be formed in the supporting member 216 for receiving a lifting bar pin to connect the connector 60 to secure the lifting bar 212 to the load supporting member 10.

Figure 11:
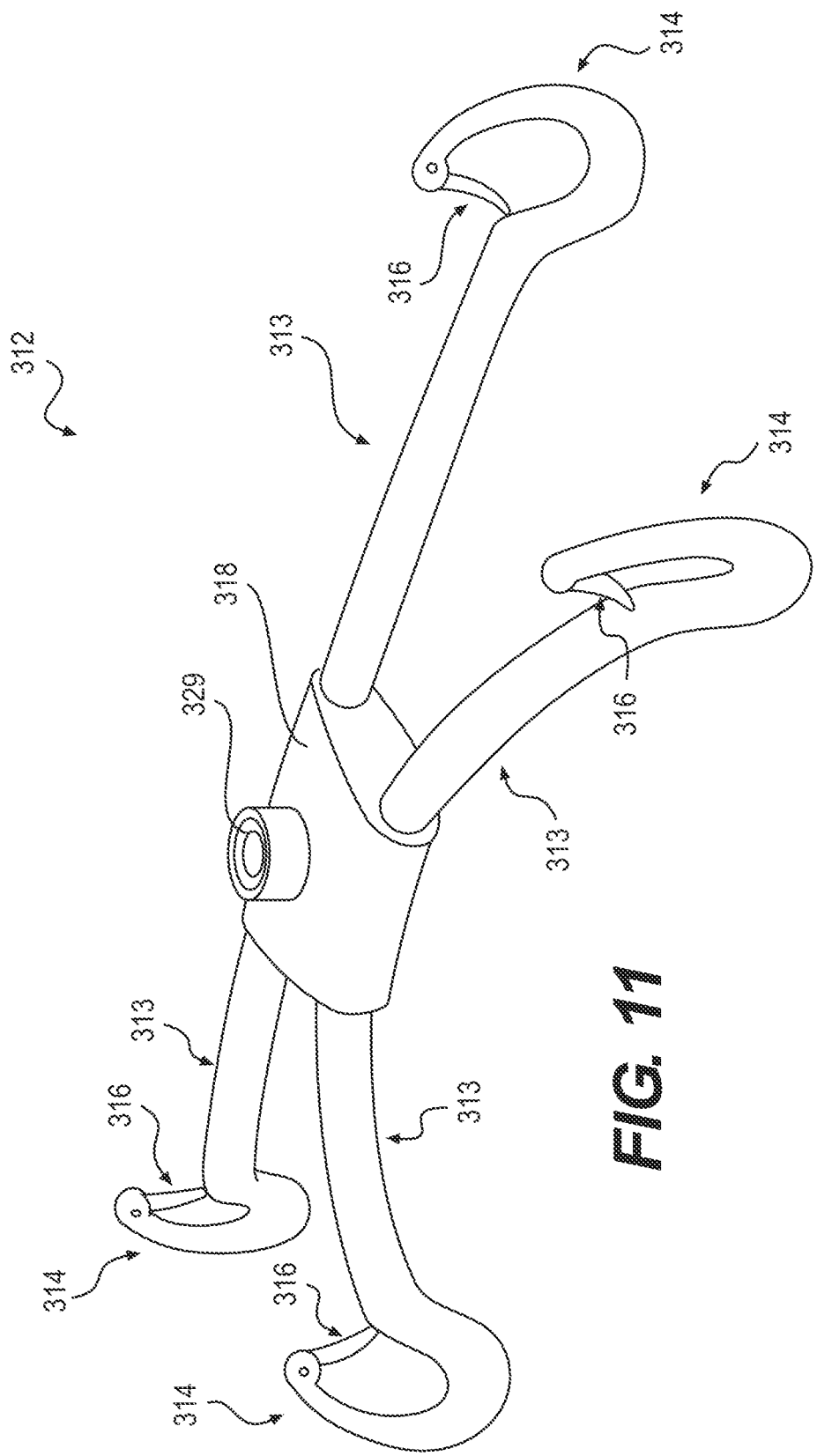
FIG. 11 is a perspective view of a lifting bar according to a fourth exemplary embodiment.

FIG. 11 shows a fourth example embodiment of a lifting bar 311 according to the present disclosure. The lifting bar 311 includes a plurality of elongate members 313 extending from a central structure 318, which may be collectively referred to as a main body. Each elongate member 313 may terminate in a support connector 314 having a movable safety mechanism 316, such as a latch, a clamp, or the like. To allow for connection to an apparatus such as the ceiling lift system 2 shown in FIG. 1, the central structure 318 of the lifting bar 311 may include a lifting bar aperture 329. The lifting bar aperture 329 may be configured to receive a lifting bar pin to connect to the connector 60 so that the lifting bar 311 may be securely connected to the load supporting member 10.

Figure 12:
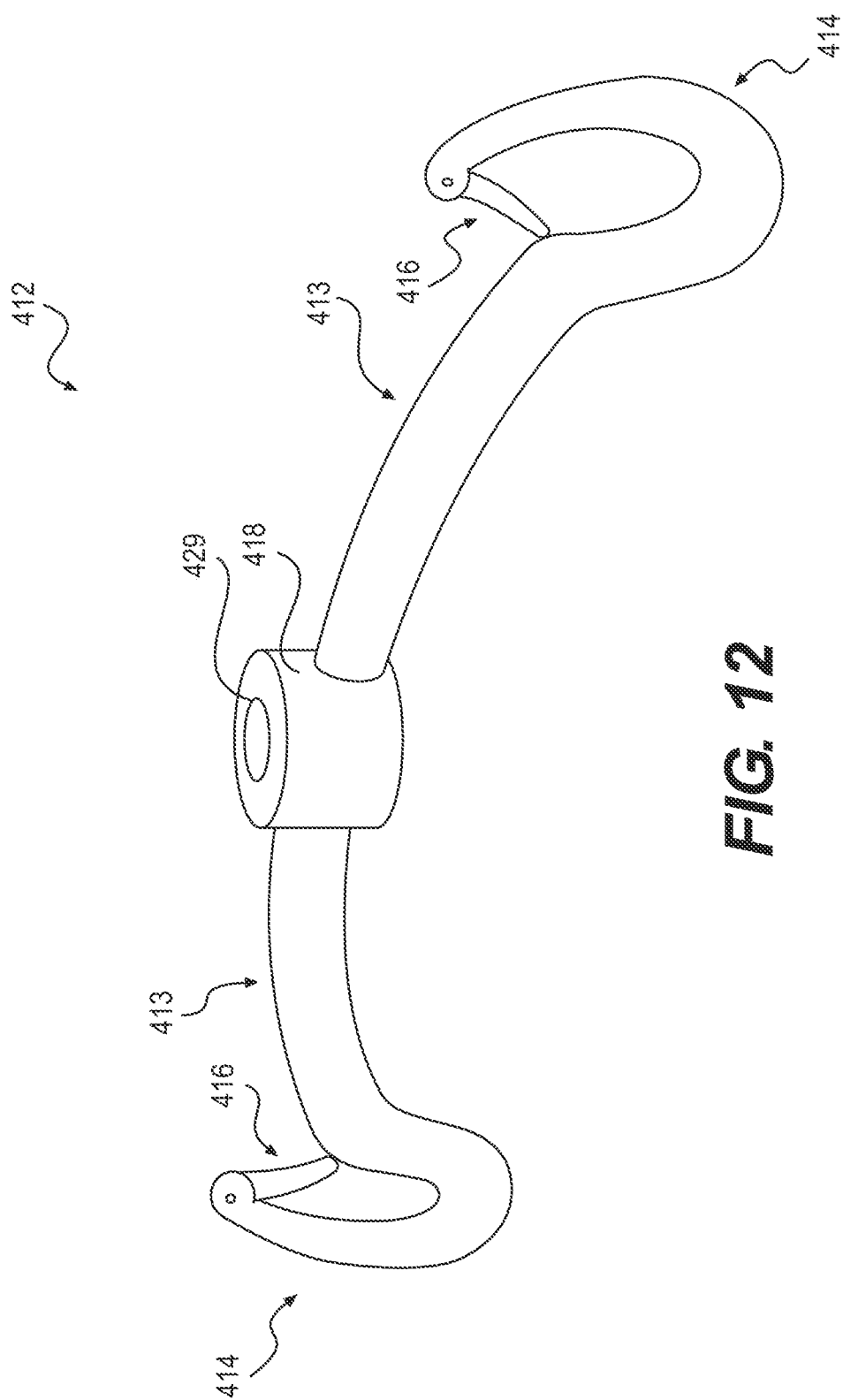
FIG. 12 is a perspective view of a lifting bar according to a fifth exemplary embodiment.

FIG. 12 shows a fifth example embodiment of a lifting bar 412 according to the present disclosure. The lifting bar 412 includes a plurality of elongate members 413 extending from a central structure 418, which may be collectively referred to as a main body. Each elongate member 413 may terminate in a support connector 414 having a movable safety mechanism 416, such as a latch, clamp, or the like. To allow for connection to an apparatus such as the ceiling lift system 2 shown in FIG. 1, the central structure 418 of the lifting bar 412 may include a lifting bar aperture 429. The lifting bar aperture 429 may be configured to receive a lifting bar pin to connect to the connector 60 so that the lifting bar 412 may be securely connected to the load supporting member 10.

Figure 13:
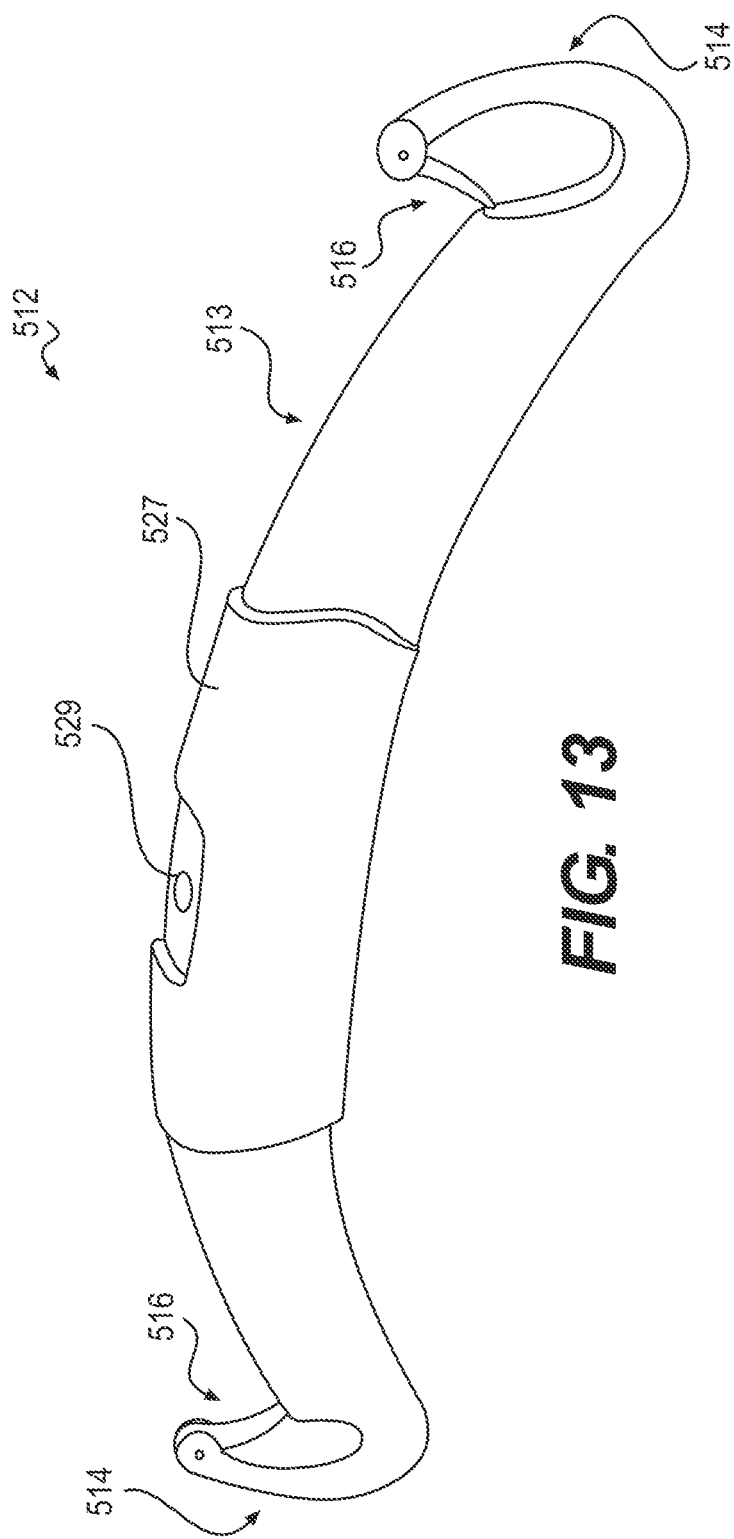
FIG. 13 is a perspective view of a lifting bar according to a sixth exemplary embodiment.

FIG. 13 illustrates a sixth example embodiment of a lifting bar 512 according to the present disclosure. The lifting bar 512 includes an elongated main body 513, which terminates at two opposite ends with support connectors 514. Each support connector 514 may include a safety mechanism 516, such as a latch, clamp, or the like. The lifting bar 512 may also include a raised member 527, which can act as an additional support, cover, or handle for a person operating the ceiling lift system 2 when the lifting bar 512 is installed. The raised member 527 may be formed either separately from or integrally with the main body 513. At a central position along the main body 513, a lifting bar aperture 529 may be provided for receiving a lifting bar pin to connect the connector 60, so that the lifting bar 512 may be securely connected to the load supporting member 10.

Figure 14:
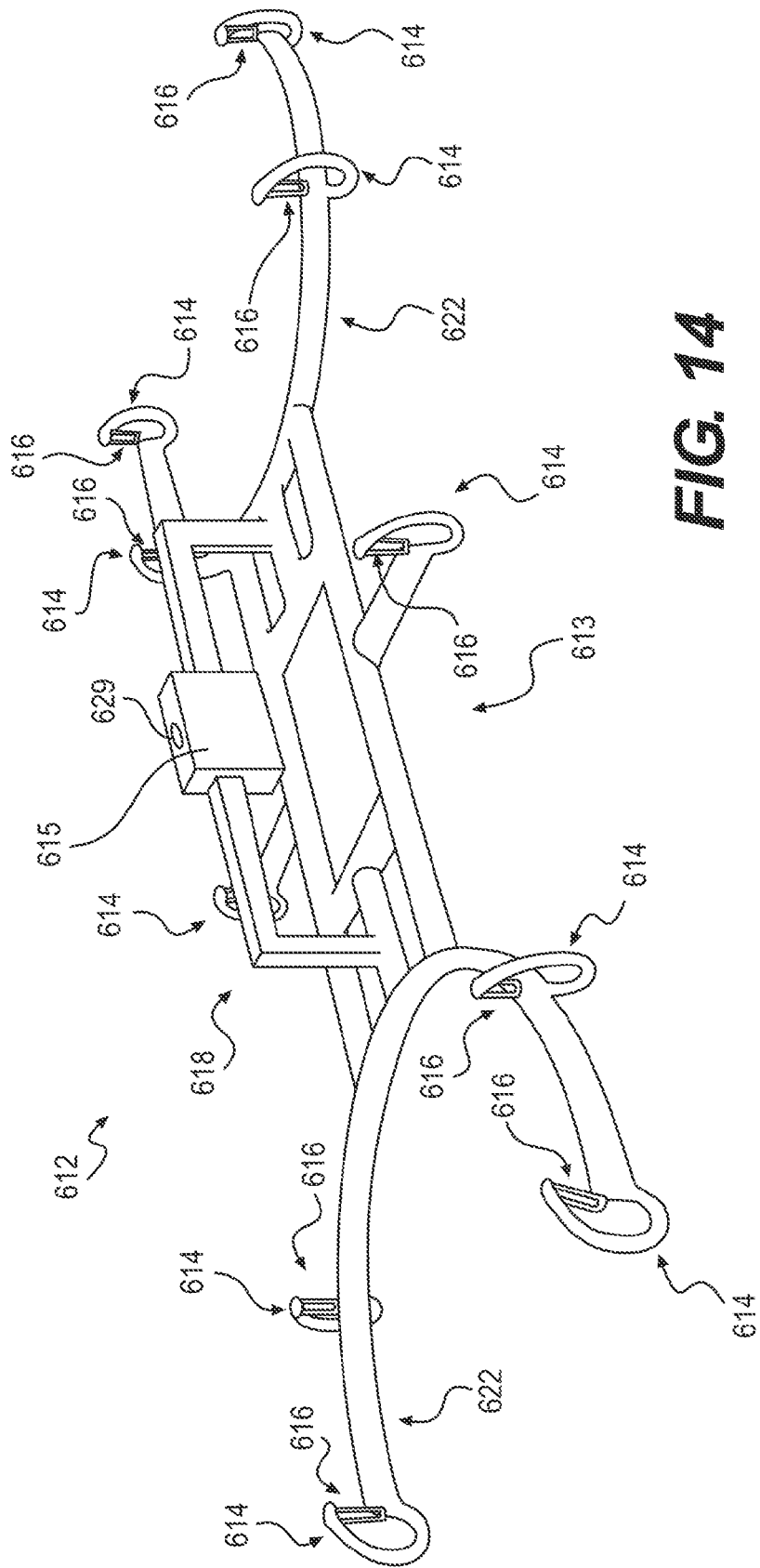
FIG. 14 is a perspective view of a lifting bar according to a seventh exemplary embodiment.

FIG. 14 shows a seventh example embodiment of a lifting bar 612 according to the present disclosure. The lifting bar 612 includes a main body 613, which may be formed of a plurality of connecting members. Extending members 622 extend from opposite ends of the main body 612, and a plurality of support connectors 614 may be provided at different positions along the extending members 622. As shown in FIG. 14, additional support connectors may also be provided on portions of the main body 613. The support connectors 614 may each include a safety mechanism 616 configured to securely retain, for example, the patient support 8 when the lifting bar 612 is in use. An additional supporting member 618 may extend from the main body 613 and be connected to a central structure 615. In some instances, as shown in FIG. 14 the additional supporting member 618 may extend in a plane that is substantially perpendicular to a plan in which the main body 613 and the extending members 622 are located. The central structure 615 may include a lifting bar aperture 629, which may be configured to receive a lifting bar pin to connect the lifting bar 612 to the connector 60 so that the lifting bar 612 may be securely connected to the load supporting member 10. The various components of the lifting bar 612, such as the main body 613, the additional supporting member 618, and the extending members 622, may be formed as bars having rectangular cross-sectional shapes, circular cross-sectional shapes, or any other cross-sectional shape.

Like the lifting bars 12, 112, either of which may be used with the connector 60, any of the lifting bars show in FIGS. 10-14 may also be used with the connector 60 and incorporated into the ceiling lift system 2 shown in FIG. 1.

The various lifting bars and the connector 60 described herein may be used with a ceiling lift or other lifting device to removably secure various components and devices together in a variety of medical and nonmedical settings. In a medical setting, for example, the ceiling lift system 2 can support a patient in the patient support 8, such as a sling. Using, for example, a controller (not shown) electrically connected to the ceiling lifter 6, an operator can move the lifting bars and load supporting member 10 via the lifter 6. When the patient is supported in the patient support 8 that is attached to the lifting bars, the patient can be moved vertically and/or horizontally. The lifter 6 may function as a winch or similar crank device such that winding takes up more of the load supporting member 10 to raise the patient, whereas unwinding may let out the load supporting member 10 to lower the patient. Moving the lifter 6 along the track system 4 can also allow for horizontal and/or vertical movement.

The various lifting bars described herein may be manufactured using various methods. For example, the lifting bars illustrated in FIGS. 1-3 and 5, 11, 12, and 13 may be entirely manufactured by injection molding in a single step. Referring to the lifting bar 12 shown in FIGS. 1-3 and 5 for example, the main body 13 and support connectors 14 can be manufactured in one step and at the same time, such that the lifting bar 12 is a single, continuous elongated member. As used herein, the term "continuous" as it refers to the structure of the lifting bar 12 may indicate that the lifting bar 12 is an elongate member without breaks, joints, or the like between the main body 13 and the support connectors 14. The lifting bar 12 may be molded to be completely solid, that is, not having any open spaces within the lifting bar main body 13 and the support connectors 14 (other than the apertures 19). In other instances, however, the lifting bar 12 may be molded around a core such that there may be empty or hollow spaces within the lifting bar 12. Additional steps, for example, abrasion techniques such as sanding, may be taken after the single molding step to further smooth the outer surface of the lifting bar 12. While the safety mechanism 28 may also be manufactured in the single injection molding step used to produce the lifting bar 12, in some instances, the safety mechanism 28 may be produced separately from the lifting bar 12. When the safety mechanism 28 is produced separately, it may be secured to the lifting bar 12 after the injection molding step is complete.

With respect to the lifting bar illustrated in FIGS. 4, 6, and 7, the lifting bar 112 may be manufactured in two injection molding steps. The inner core 150 may first be secured in place by connecting retaining pins through the various retaining pin holes 164. These retaining pins (not shown) may hold the lifting bar 112 in place during at least a first step of the injection molding process. During the first step, the material, such as a thermo-plastic, can be over-molded around the entire inner core 150 to form a capsule such that the inner core 150 is encapsulated or surrounded by the molded material. Because the inner core 150 is held in place by the retaining pins, however, unfilled space, or holes, may exist where the retaining pins were located. The retaining pins can be removed after the first molding step and, during a second step of the injection molding after the first step, additional material can be injected to mold the lifting bar main body 113, the support connectors 114, and/or the safety mechanism 102. In some instances, the safety mechanism 102 is produced separately from the injection molding steps, such that the safety mechanism 102 may be secured to the lifting bar 112 after the two injection molding steps are complete. The second step of the injection molding may also fill in the spaces formed by the retaining pins. The second step may result in a strip 125 of material being formed along one or more portions of the lifting bar 112. In some instances, the material used during the first and second steps may be the same material. In other instances, however, the material used to fill in the spaces left by the retaining pins in the second step may be different from the material used to mold the main body 113 and support connectors 114 during the first step. If, for example, an undesired strip of material or imperfection results from the two injection molding steps, additional steps, such as abrasion techniques like sanding, may be taken to smooth the outer surface of the lifting bar 112.

In any of the described methods of manufacturing the lifting bars, the resultant surface finish of the lifting bars may be non-porous, cavity-free, and/or smooth. The lifting bar 12 as shown in FIG. 2, for example, may be manufactured in one injection molding step as a single continuous element having few, if any, cavities and/or other details on its surface. While the lifting bar 112 as shown in FIG. 4 may be manufactured in multiple steps, it can also exhibit a smooth, generally cavity-free surface finish.

Hygiene can be important in preventing the spread of disease in medical settings. To prevent cross-contamination of infected surfaces and other structures, caregivers must be diligent in cleaning equipment and areas accessible to patients by, for example, using a known disinfectant. The described lifting bars may be subject to manipulation in a patient room, for example, such that it is important to reduce the risk of cross-contamination. The lifting bars may facilitate the ease with which the lifting bars can be cleaned, which can reduce the time needed for cleaning, thereby enhancing efficiency and lowering costs. The smooth, non-porous surface finish of the lifting bars can also allow for better cleaning results, resulting from a quick and continuous cleaning movement that can be employed, which can in turn decrease the spread of disease. The lifting bars described herein may be provided without having one or more of the following: details such as steps between various profiles forming the lifting bar body or other small, hard-to-reach features; separately connected support connectors; joints or junctions that may create cavities that can be difficult to effectively clean; or the like. For example, the single-element design of the lifting bar 12, manufactured in a single step as described herein, can contribute to the smooth surface finish and the ease with which the lifting bar 12 is cleaned. The lifting bar 112 of FIG. 4, which may be manufactured in multiple steps, can also have a smooth, uninterrupted surface finish allowing for easy cleaning. Furthermore, in instances when the lifting bars are integrated with the load supporting member 10, the integration can result in a structure that requires less effort to effectively clean. The spaces, such as spaces 26, 126 defined by the support connectors 14, 114, of lifting bars 12, 112, respectively, can also be large enough and smooth so as to be easily accessible to, for example, a caregiver, so that the caregiver may manually clean the support connector 14, 114, including the supporting surface 24, 124, and to enable insertion or attachment of the patient support 8 to the lifting bars 12, 112. In addition to the lifting bar, the hand control (not shown) can also include a smooth, flexible membrane, rather than highly texturized control buttons. This can facilitate the ease with which the hand control is cleaned, while providing a hand control that is easy to use, ergonomic, aesthetic, compact, and that has a generally low manufacturing cost.

During a medical procedure, safety, efficiency, and cleanliness are often important for the caregiver to provide effective care to a patient. This is especially true as the number of patients and procedures a caregiver is responsible for increases. During procedures where a lift device may be used, a lifting bar, such as the various lifting bars described herein, may need to be repeatedly connected and disconnected to and from a load supporting member. The lifting bar connector 60 described herein may be a compact and easy-to-clean device that enables fast, easily initiated, and sturdy connection and/or disconnection between various load supporting members and lifting bars. The lifting bar connector 60 can allow for quick replacement of a lifting bar with another similar or different lifting bar in a manner that is intuitive and safe for the patient and caregiver. Moreover, the connector 60 may not significantly reduce the lifting stroke, that is, the vertical distance in which the lifting bar and attachments may travel, of the ceiling lift system 2. Additionally, the smooth or streamlined design of the connector 60, particularly the connecting block cover 35, may allow for simple and effective cleaning of the connector 60 and surrounding area. Because the connector 60 may be frequently handled by a person during connection and disconnection of the various lifting bars, easy and complete cleaning of the connector 60 and surrounding area can be important to preventing the spread of disease.

The attaching and detaching sequence described herein may be generally quick and simple, as it involves a clipping action as the load supporting member 10, pin holder 20, and pin 30 are pushed to or pulled away from the connecting block 65 of the connector 60. The attachment method may be especially convenient because there is no need to first unlock a device before the attachment. The attachment latch 100 being biased to the closed position, for example, allows for attachment of the load supporting member 10, pin holder 20, and pin 30 without having to unlock any portion of the device, while securely retaining these elements within the connecting block 65. While there is no "unlocking" required prior to attachment, because the attachment latch 100 is biased to the closed position (e.g., by using the attachment latch spring 15), the attachment latch 100 may function as a safety device that resists accidental detachment of the load supporting member 10, pin holder 20, and pin 30 from the lifting bars. As described herein, a safety measure is incorporated into the present device and method by requiring manual, voluntary action to achieve detachment.

It will be apparent to those skilled in the art that various modifications and variations can be made to the disclosed apparatus and method. Other embodiments will be apparent to those skilled in the art from consideration of the specification and practice of the disclosed system and method. It is intended that the specification and examples be considered as exemplary only, with a true scope being indicated by the following claims and their equivalents.

What is claimed is:

1. A patient lift connector for attaching and detaching a patient lifting bar to a load supporting member in a patient lifting system, wherein the connector comprises:
    a connector body including a connecting block configured to be fixedly attached to the patient lifting bar;
    a pin holder coupled to the load supporting member and configured to be inserted through the connector body and into the connecting block; and
    an attachment latch secured to the connector body and configured to move between an open position and a closed position within the connector body, such that when the attachment latch moves from the closed position to the open position, the pin holder is allowed to be inserted into the connecting block and thereby allow the lifting bar to be attached to the load supporting member.

2. The connector of claim 1, wherein the connecting block includes an aperture configured to receive a lifting bar pin that extends through the lifting bar.

3. The connector of claim 1, wherein the connector body includes an indent and wherein the attachment latch includes a latch flange configured to abut the indent when the attachment latch is in the closed position.

4. The connector of claim 1, further comprising:
    a slot formed in the connecting block;
    wherein the pin holder is configured to slide within the slot during attachment and detachment of the lifting bar.

5. The connector of claim 4, further comprising:
    a pin configured to be disposed within a pin holder drum of the pin holder,
    wherein the pin is configured to slide within the slot during attachment and detachment of the lifting bar.

6. The connector of claim 1, wherein the attachment latch includes a latch pin and the connector body includes a plurality of latch pin apertures, and wherein the attachment latch is configured to move between the open position and the closed position by rotating the latch pin within the latch pin apertures.

7. The connector of claim 1, wherein the attachment latch includes a biasing element configured to bias the attachment latch to the closed position.

8. The connector of claim 7, wherein the biasing element is a spring.

9. The connector of claim 1, wherein the connecting block is configured to allow the pin holder to rotate within the connector block when the attachment latch is in the closed position.

10. The connector of claim 1, wherein the pin holder includes a plurality of wings configured to abut a top of the connector body to prevent downward motion of the pin holder when the lifting bar is attached to the load supporting member.

11. The connector of claim 1, wherein the connector body includes a block cover, and wherein the connecting block is disposed within a socket of the block cover.

12. The connector of claim 1, wherein the connecting block is fixedly attached to the patient lifting bar by a connecting block pin extending through the connecting block.

13. The connector of claim 1, wherein the lifting bar, which is configured to be attached and detached from the load supporting member, comprises:
    an elongated main body;
    a support connector extending from the main body and configured to support a patient lift apparatus on a first surface of the support connector; and
    a safety mechanism movably connected to the support connector and for enclosing a space defined, at least in part, by the first surface of the support connector,
    wherein the support connector is integrally connected to a portion of the elongated main body, such that the lifting bar is a single structural element.

14. A patient lift connector for attaching a patient lifting bar to a load supporting member in a patient lifting system, wherein the connector comprises:
    a connector body including a connecting block configured to be fixedly attached to the patient lifting bar;
    a terminating component of the load supporting member that is configured to be inserted through the connector body and into a slot of the connecting block; and
    an attachment latch secured to the connector body and configured to move between an open position and a closed position within the connector body, wherein the terminating component is configured to move the attachment latch from the closed position to the open position to cause attachment of the lifting bar to the load supporting member,
    wherein the slot of the connecting block is covered by another part of the connector body.

15. The ceiling lift system of claim 14, wherein the connector further comprises:
    a pin configured to be disposed within a pin holder drum of the terminating component,
    wherein the pin is configured to slide within the slot during attachment and detachment of the lifting bar.

16. The ceiling lift system of claim 14, wherein the lifting bar, configured to be attached and detached from the load supporting member, comprises:
    an elongated main body;
    a support connector extending from the main body and configured to support a patient lift apparatus on a first surface of the support connector; and
    a safety mechanism movably connected to the support connector and for enclosing a space defined, at least in part, by the first surface of the support connector,
    wherein the support connector is configured to be connected to a portion of the elongated main body.

17. The ceiling lift system of claim 14, further comprising a cover removably disposed over the lifting bar.

18. A method for attaching a patient lifting bar to a load supporting member in a patient lifting system through the use of a connector, the method comprising:
    pressing a terminating component of the load supporting member against an attachment latch of the connector, wherein the attachment latch is secured to a connector body configured to be connected to the lifting bar; and
    moving the terminating component through a part of the connector body and into a slot of a connecting block, wherein the attachment latch is configured to move between an open position and a closed position within the connector body, such that the attachment latch moves to the open position when the terminating component is pressed against the attachment latch and wherein the attachment latch moves to the closed position when the terminating component moves along the slot of the connecting block.

19. The method of claim 18, further comprising:

lifting the terminating component within the slot; and rotating the terminating component in a first direction until a portion of the terminating component abuts a top of the connecting block.

20. The method of claim 18, wherein the pressing moves the attachment latch between an open position and a closed position.

* * * * *